United States Patent Office 2,812,334
Patented Nov. 5, 1957

2,812,334

ORGANIC COMPOUNDS

Robert B. Moffett, Kalamazoo, Mich., assignor to The Upjohn Company, Kalamazoo, Mich., a corporation of Michigan No Drawing. Application February 10, 1956,
Serial No. 564,643

8 Claims. (Cl. 260—326.3)

This invention relates to novel spiro[cycloalkane-1,2'-pyrrolidyl-1']-alkyl esters of disubstituted acetic acids. This application is a continuation-in-part of application Serial No. 522,847, filed July 18, 1955.

This invention has among its objects the provision of novel spiro[cycloalkane - 1,2' - pyrrolidyl - 1'] - alkyl esters of disubstituted acetic acids, which can exist in the form of the free bases or coordination complexes thereof such as the amine oxides, quaternary ammonium compounds, acid addition salts and the amine oxide acid addition salts. The novel compounds of this invention have the following general structural formula:

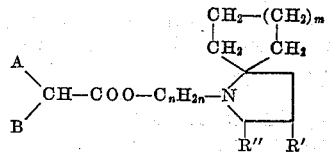

wherein substituents A and B are the same or different hydrocarbon radicals such as alkyl, alkenyl, cycloalkyl, cycloalkenyl, aralkyl, or aryl, preferably being lower-hydrocarbon radicals having from one to twelve carbon atoms, inclusive. Sustituents A and B can be substituted by groups such as halogen, amino, lower-alkoxy, and the like. Examples of substituents A and B are methyl, ethyl, propyl, butyl, octyl, dodecyl, 2-chloroethyl, allyl, butenyl, cyclohexyl, cyclopentyl, cyclohexenyl, cyclopentenyl, benzyl, phenethyl, p-chlorobenzyl, phenyl, p-biphenylyl, tolyl, xylyl, p-aminophenyl, p-propoxyphenyl, o,o'-dimethyl-p-propoxyphenyl, and the like. R' and R" are hydrogen or methyl, $m$ is a whole number from one to two, inclusive, $n$ is a whole number from two to six, inclusive and —$C_nH_{2n}$ is a lower alkylene radical having at least two carbon atoms between the valences.

The novel compounds of this invention possess pronounced uterine stimulatory properties characterized by prolonged action. They are inactive as diuretics and possess no or very little other known detrimental side effects. The quaternary ammonium compounds, e. g., the methobromides, ethochlorides, methosulfates, and the like exhibit qualitatively good ganglionic activity in the pharmacodynamic assay, without outstanding anticholinergic action.

The compounds of this invention are prepared by esterifying 2-spiropyrrolidylalkanols of the formula:

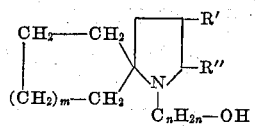

wherein R', R", $m$, $n$, and —$C_nH_{2n}$— have the values set forth above, with a disubstituted acetic acid halide:

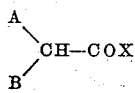

wherein A and B have the values given above and X is chlorine or bromine. The esterification is preferably accomplished in an inert solvent such as benzene using conventional esterifying conditions.

The 2-spiropyrrolidylalkanols can be prepared by the following series of reactions:

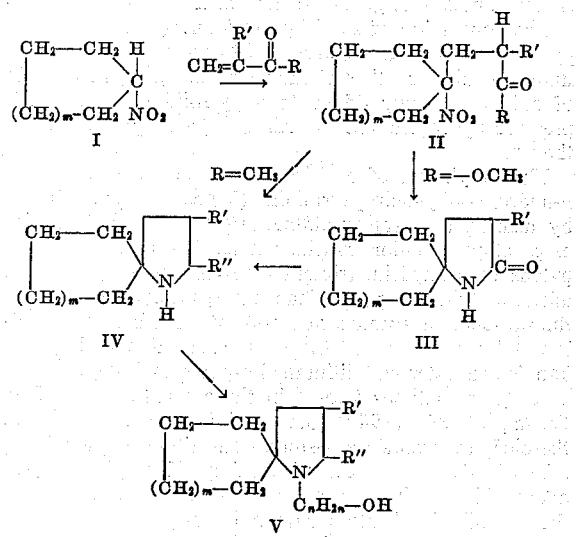

in which R', R", $m$, $n$, and —$C_nH_{2n}$— have the values stated above, and R is lower-alkoxy, preferably methoxy or ethoxy, or methyl.

Suitable disubstituted acetic acid halides are described by Kolloff et al., J. Am. Chem. Soc., 70, 3862 (1948); ibid., 72, 1650 (1950); and U. S. Patent 2,655,511. Others includes isobutyric acid chloride, isobutyric acid bromide, diethylacetic acid chloride, diethylacetic acid bromide, methyl isohexyl acetic acid chloride, methyl isoamyl acetic acid chloride, ethyl butyl acetic acid chloride, methyl propyl acetic acid chloride, propyl allyl acetic acid chloride, and the like.

The novel compounds of this invention are usually administered orally, preferably as an acid addition salt, e. g., hydrochloride, hydrobromide, hydriodide, sulfate, citrate, acetate, succinate, nitrate; or as a quaternary ammonium salt, e. g., methobromide, methiodide, ethochloride; or as an amine oxide (prepared by oxidation of these compounds with a peracid or hydrogen peroxide) or addition salt thereof, etc. Suitable forms include tablets, stable aqueous solutions, elixirs, etc.

The preparation of the compounds of Formula V involves the conversion of a nitrocycloalkane (I) to a spiro-substituted-pyrrolidine (IV). In carrying out the first step of this conversion, a nitrocycloalkane (I) is condensed with an olefinic compound, preferably an alkyl acrylate, represented by the following formula:

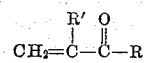

wherein R and R' have the values given hereinbefore and especially wherein R is lower-alkoxy, preferably methoxy or ethoxy, and R' is hydrogen, to produce a 1-(β - carbonylethyl) - nitrocycloalkane represented by Formula II. The reaction conditions described by Moffett and White, J. Org. Chem., 17, 407 (1952) can be employed using a condensing catalyst, preferably aqueous benzyltrimethylammonium hydroxide, sodium hydroxide, potassium hydroxide, or other strong base. Other bases, e. g., piperidine, pyrrolidine, morpholine, can also be used. The resulting product (II) can then be isolated and purified, e. g., in the manner described hereinafter, or the reaction mixture freed of solvent and used without isolation in the subsequent reduction reaction.

In the reduction step, a compound represented by Formula II is reductively cyclized to produce a spiro-pyrrolidine (IV) when R is methyl or a spiropyrrolidone (III) when R is lower-alkoxy. In the former case, the cyclization is accomplished with hydrogen and a hydrogenation catalyst, e. g., Raney nickel, etc. In the latter case, the hydrogenation is accomplished by hydrogenation with a suitable catalyst, e. g., in the manner described by Moffett and White (loc. cit.) and as described hereinafter, or by chemical means, e. g., zinc or iron in the presence of acid.

The conversion of a spiropyrrolidone (III) to a spiropyrrolidine (IV) can be accomplished with lithium aluminum hydride, or other chemical reducing agent capable of reducing a pyrrolidone to a pyrrolidine, or by high pressure hydrogenation according to techniques known in the art.

The alkylation of a spiropyrrolidine (IV) to an N-ω-hydroxy-alkyl-spiropyrrolidine (V) can be accomplished by heating a spiropyrrolidine (IV) with a halohydrin, e. g., ethylene chlorohydrin, ethylene bromohydrin, propylene chlorohydrin, trimethylene chlorohydrin, etc., an alkylene oxide, e. g., ethylene oxide, propylene oxide, in the presence or absence of a solvent, or a halo ester followed by reduction of the thus-produced pyrrolidyl alkanoic acid ester with lithium aluminum hydride, e. g., according to methods known in the art [Moffett, J. Org. Chem., 14, 862 (1949) and previous papers referred to therein], to produce a 2-sipro - substituted - pyrrolidyl-alkanol (V) of the present invention. Examples of these alkanols include those represented by Formula V wherein the pyrrolidyl substituted alkanol group is ethanol, propanol, 1-methyl-ethanol, 1-methylpropanol, 2-methylpropanol, 1,2-dimethylpropanol, 1,3 - dimethylpropanol, 2,3-dimethylpropanol, 1,2,3-trimethylpropanol, butanol, pentanol, hexanol, 2,3-dimethylbutanol, 1-methylpentanol, etc. group.

The following preparations and examples are illustrative of the process and products of the present invention but are not to be construed as limiting.

PREPARATION 1.—METHYL β-(1-NITROCYCLOHEXYL)-PROPIONATE

In a one-liter, three-necked flask fitted with stirrer, dropping funnel and thermometer were placed 333 grams (2.55 moles) of nitrocyclohexane (technical grade, redistilled), 300 milliliters of dioxane (lithium aluminum hydride-treated and redistilled) and thirty milliliters of a 35 percent methanolic solution of benzyltrimethylammonium hydroxide. To the resulting stirred mixture was added 227.5 grams (2.55 moles) of methyl acrylate (redistilled) over a period of fifteen minutes, during which time the temperature rose to above 100 degrees centigrade. When the temperature had dropped to about 55 degrees centigrade, the mixture was heated on a steam bath with stirring for three hours and then maintained at room temperature for about eighteen hours. The mixture was then diluted with about one liter of ether, acidified with dilute hydrochloric acid, extracted twice with a saturated aqueous sodium chloride solution, then with an aqueous sodium chloride solution containing a little sodium bicarbonate and finally with saturated aqueous sodium chloride solution. The organic layer was separated, dried and distilled through a Vigreaux column. There was thus obtained 523.3 grams, a yield of 96.8 percent of the theoretical, of methyl β-(1-nitrocyclohexyl)-propionate distilling at between 96.5 degrees centigrade at a pressure of 0.05 millimeter of mercury absolute to 124.5 degrees at a pressure of 0.35 millimeter and having an $n_D^{25}$ of 1.4710. A sample was redistilled through a six-inch, helix-packed column to give a fraction boiling at 96 degrees centigrade at 0.025 millimeter pressure and having the analysis below.

Calcd. for $C_{10}H_{17}NO_4$: C, 55.80; H, 7.96; N, 6.51.
Found: C, 56.05; H, 8.02; N, 6.48.

PREPARATION 2.—SPIRO [CYCLOHEXANE-1,2'-PYRROLIDONE-5']

A solution of 453.3 grams (2.11 moles) of methyl β-(1-nitrocyclohexyl)-propionate in 1.26 liters of methanol-denatured ethanol (3A) was hydrogenated in the presence of Raney nickel catalyst for eighteen hours at fifty degrees centigrade. The mixture was cooled, filtered and the filtrate distilled to dryness at reduced pressure. The white crystalline residue was dissolved in two liters of boiling methylcyclohexane which was then distilled until about 100 milliliters had been collected, to remove any residual ethanol. The solution was clarified by pressure filtration while hot and then cooled. There was thus obtained 253 grams, a yield of 72 percent of the theoretical, of spiro[cyclohexane - 1,2' - pyrrolidone - 5'] melting at 131 to 133 degrees centigrade. A further 31.4 grams of product melting at 129 to 132 degrees centigrade was obtained by concentration of the mother liquor. A sample recrystallized from Skellysolve B (hexanehydrocarbons) melted at 132 to 133 degrees centigrade and had the analysis below.

Calculated for $C_9H_{15}NO$: N, 9.14. Found: N, 9.03.

The product is a very weak base moderately soluble in water, very soluble in dilute mineral acids and unaffected by boiling twenty percent sodium hydroxide or sulfuric acid.

PREPARATION 3.—SPIRO[CYCLOHEXANE-1,2'-PYRROLIDINE]

A mixture of 95 grams (2.5 moles) of lithium aluminum hydride and 1.5 liters of tetrahydrofuran (distilled from lithium aluminum hydride) was refluxed with stirring for a few minutes and then a solution of 206 grams (1.343 moles) of spiro[cyclohexane - 1,2' - pyrrolidone-5'] dissolved in 1.1 liters of tetrahydrofuran was slowly added. The stirred mixture was then heated at its refluxing temperature for eighteen hours. About two liters of solvent was removed by distillation and the following were slowly added to the residue in succession: one liter of U. S. P. ether, 200 milliliters of ethyl acetate, and one liter of concentrated hydrochloric acid dissolved in 1.5 liters of water. The strongly acidic solution was steam distilled until a distillation temperature of 100 degrees centigrade was reached. To the hot residue was added about 1,760 grams of aqueous fifty percent sodium hydroxide. The mixture was then steam distilled until practically no basic material came over with the distillate. The four liters of basic distillate was extracted twice with about one-liter portions of ether. The extracted aqueous layer was then subjected to continuous extraction with ether for six hours. The combined ether extracts were thoroughly dried with anhydrous potassium carbonate.

This procedure was followed on another run employing 83.5 grams of lithium aluminum hydride, 168.5 grams of spiro[cyclohexane-1, 2' - pyrrolidone - 5'] and two liters of tetrahydrofuran.

The combined runs were distilled through a twelve-inch column packed with ⅛-inch helices. After the solvent had been removed, the residue was distilled at reduced pressure. There was obtained a 286 gram fraction of spiro[cyclohexane - 1,2' - pyrrolidine] distilling at 99 to 104 degrees centigrade at a pressure of 42 millimeters of mercury absolute and having an $n_D^{25}$ of 1.4817 and the analysis below.

Calcd. for $C_9H_{17}N$: C, 77.63; H, 12.31; N, 10.06.
Found: C, 77.95; H, 11.88; N, 9.24.

PREPARATION 4.—β-SPIRO[CYCLOHEXANE-1,2'-PYRROLIDYL-1']-ETHANOL

A stirred mixture of 27.84 grams (0.2 mole) of spiro[cyclohexane-1,2'-pyrrolidine] and 16.1 grams (0.2 mole) of ethylene chlorohydrin in a 100-milliliter, round-bottomed flask fitted with a thermometer, reflux condenser and magnetic stirrer was rapidly heated to 120 degrees centigrade. The heat was removed as the mixture spontaneously rose to about 167 degrees centigrade. When the temperature had dropped to 120 degrees centigrade, the flask was again heated at 130 to 150 degrees centigrade for fifteen minutes. The cooled solution was mixed with thirty milliliters of aqueous fifty percent sodium hydroxide and then extracted thoroughly with four portions of ether. The combined ether extracts were dried with potassium carbonate, filtered and the ether removed by distillation. The residue was distilled through a six-inch column packed with ⅛-inch helices. After a forerun of spiro[cyclohexane-1,2'-pyrrolidine] was removed, there was obtained 23.3 grams of β-spiro[cyclohexane-1,2'-pyrrolidyl-1']-ethanol distilling at 138 degrees centigrade at an absolute pressure of twelve millimeters of mercury. A sample taken from the center cut of the distillate had an $n_D^{25}$ of 1.5010 and the analysis below.

Calcd. for $C_{11}H_{21}NO$: C, 72.08; H, 11.55; N, 7.64. Found: C, 72.41; H, 11.87; N, 7.66.

β-Spiro[cyclohexane-1,2'-pyrrolidyl-1']-ethanol hydrochloride was prepared by adding an excess of anhydrous hydrogen chloride to a cooled solution of β-spiro[cyclohexane-1,2'-pyrrolidyl-1']-ethanol in benzene. The precipitated, crystalline hydrochloride was filtered. A sample recrystallized from isopropyl alcohol gave spiro[cyclohexane-1,2'-pyrrolidyl-1']-ethanol hydrochloride melting at 177.5 to 179 degrees centigrade and having the analysis below.

Calcd. for $C_{11}H_{22}ClNO$: Cl, 16.13. Found: Cl, 16.30.

PREPARATION 5.—γ-SPIRO[CYCLOHEXANE-1,2'-PYRROLIDYL-1']-PROPANOL

Following the procedure of Preparation 4, but employing 27.84 grams (0.2 mole) of spiro[cyclohexane-1,2'-pyrrolidine] and 18.9 grams (0.2 mole) of trimethylene chlorohydrin, there was thus obtained 23.43 grams of γ-spiro[cyclohexane-1,2'-pyrrolidyl-1']-propanol distilling at 155 degrees centigrade at an absolute pressure of 11.5 millimeters of mercury, having an $n_D^{25}$ of 1.4979 and the analysis below.

Calculated for $C_{12}H_{23}NO$: N, 7.10. Found: N, 7.12.

*Example 1.—β - Spiro[cyclohexane - 1,2' - pyrrolidyl-1'] - ethyl α' - n - propyl - cyclopentane - acetate, hydrochloride and methobromide*

To a solution of 9.33 grams (0.05 mole) of β-spiro[cyclohexane - 1,2' - pyrrolidyl - 1'] - ethanol in fifty milliliters of dry benzene was added 11.3 grams of α-n-propyl-cyclopentane-acetyl chloride [Moffett et al., J. Org. Chem. 15, 343 (1950)]. A white precipitate appeared almost immediately but redissolved on heating the mixture at its refluxing temperature for three hours. The solution was maintained at room temperature for about eighteen hours and then mixed with thirty milliliters of aqueous ten percent sodium hydroxide. The organic layer was extracted thoroughly with ether which was then washed with water. The solution was dried, the ether distilled and the residue distilled at reduced pressure. An 8.34 gram fraction of β - spiro - [cyclohexane - 1,2' - pyrrolidyl - 1'] - ethyl α'-n-propyl-cyclopentane-acetate boiling at 146 to 147 degrees centigrade at an absolute pressure of 0.04 millimeter of mercury was obtained.

The product thus obtained was dissolved in ether and the solution acidified with ethanolic hydrogen chloride. The β - spiro[cyclohexane - 1,2' - pyrrolidyl - 1'] - ethyl α'-n-propyl-cyclopentane-acetate hydrochloride thus obtained, after separation from the solvent, weighed 8.2 grams, melted at 151 to 152 degrees centigrade and had the analysis below.

Calcd. for $C_{21}H_{38}ClNO_2$: C, 67.80; H, 10.30; Cl, 9.53. Found: C, 68.21; H, 10.16; Cl, 9.53.

Additional free base was obtained by making alkaline the filtrate obtained from the filtration of the hydrochloride, separating the precipitated base and mixing it with the high- and lower-boiling fractions recovered from the distillation described above and redistilling the whole. There was thus obtained seven grams of β-spiro[cyclohexane - 1,2' - pyrrolidyl - 1'] - ethyl α' - n - propyl - cyclopentane-acetate distilling at 146 degrees centigrade at 0.05 millimeter of mercury, and having the analysis below.

Calculated for $C_{21}H_{37}NO_2$: N, 4.17. Found: N, 4.00.

A cold solution of 6.5 grams of β-spiro[cyclohexane-1,2' - pyrrolidyl - 1'] - ethyl α' - n - propyl - cyclopentane-acetate in 25 milliliters of methyl ethyl ketone was mixed with an excess of cold methyl bromide. The mixture was maintained in a tightly stoppered flask for two days at room temperature. The precipitated β-spiro[cyclohexane-1,2' - pyrrolidyl - 1'] - ethyl α' - n - propyl - cyclopentane-acetate methobromide, after filtering and drying, weighed 5.06 grams, melted at 152 to 154 degrees centigrade and had the analysis below.

Calcd. for $C_{22}H_{40}BrNO_2$: C, 61.38; H, 9.37; Br, 18.57. Found: C, 61.64; H, 9.34; Br, 18.58.

*Example 2.—β - Spiro[cyclohexane - 1,2' - pyrrolidyl-1']-ethyl α' - phenyl - $\Delta^2$ - cyclopentene - acetate, hydrochloride and methobromide*

Following the procedure described above for the preparation of β - spiro[cyclohexane - 1,2' - pyrrolidyl - 1']-ethyl α'-n-propyl-cyclopentane-acetate, but using 11.6 grams of β - spiro[cyclohexane - 1,2' - pyrrolidyl - 1']-ethanol and 15.5 grams of α-phenyl-$\Delta^2$-cyclopentene-acetyl chloride [Horclois, Chemie and Industrie, Special No., pages 357–63 (April 1934)] in fifty milliliters of dry benzene, there was obtained 22.17 grams, a yield of 95 percent of the theoretical, of β-spiro[cyclohexane-1,2'-pyrrolidyl - 1'] - ethyl α' - phenyl - $\Delta^2$ - cyclopentene-acetate boiling at 163 degrees centigrade at an absolute pressure of 0.01 millimeter of mercury and having the analysis below.

Calcd. for $C_{24}H_{33}NO_2$: C, 78.43; H, 9.05; N, 3.81. Found: C, 78.80; H, 8.88; N, 3.84.

A solution of 16.3 grams of the free base obtained as described above in dry ether was acidified with ethanolic hydrogen chloride. An oil was obtained which crystallized from ethyl acetate to give 12.7 grams of β-spiro[cyclohexane - 1,2' - pyrrolidyl - 1'] - ethyl α' - phenyl - $\Delta^2$-cyclopentene-acetate hydrochloride melting at 140 to 142 degrees centigrade and having the analysis below.

Calcd. for $C_{24}H_{34}ClNO_2$: C, 71.33; H, 8.48; Cl, 8.78. Found: C, 71.31; H, 8.37; Cl, 8.96.

A cold solution of 4.55 grams of the free base obtained as described above in 25 milliliters of methyl ethyl ketone was mixed with five grams of cold methyl bromide. The tightly stoppered flask was maintained at room temperature for five days. The white crystals of β-spiro[cyclohexane-1,2'-pyrrolidyl-1']-ethyl α'-phenyl-$\Delta^2$-cyclopentene-acetate methobromide were separated and, after washing with methyl ethyl ketone and then with absolute ether, weighed five grams and melted at 167.5 to 169 degrees centigrade and had the analysis below.

Calcd. for $C_{25}H_{36}BrNO_2$: C, 64.92; H, 7.85; Br, 17.28. Found: C, 65.01; H, 7.98; Br, 17.49.

*Example 3.—β - Spiro[cyclohexane - 1,2' - pyrrolidyl - 1']-ethyl α'-phenyl-cyclopentane-acetate hydrochloride*

A solution of 9.47 grams (0.0234 mole) of β-spiro[cyclohexane-1,2'-pyrrolidyl-1']-ethyl α'-phenyl-$\Delta^2$-cyclopentene-acetate hydrochloride in 150 milliliters of 95 percent ethanol was hydrogenated at room temperature at a pressure of forty pounds in excess of atmospheric pressure in the presence of 0.1 gram of platinum oxide catalyst. The theoretical amount of hydrogen was absorbed within ten minutes. The solution was filtered and the filtrate distilled nearly to dryness below forty degrees centigrade at reduced pressure. The residue was dissolved in ethyl acetate and crystallized therefrom by the addition of ether. The white crystalline precipitate was filtered, washed with ether and dried to give 7.88 grams of β-spiro[cyclohexane-1,2'-pyrrolidyl-1']-ethyl α'-phenyl-cyclopentane-acetate hydrochloride melting at 152 to 153.5 degrees centigrade and having the analysis below.

Calcd. for $C_{24}H_{36}ClNO_2$: C, 70.99; H, 8.94; Cl, 8.73. Found: C, 71.21; H, 8.88; Cl, 8.77.

Following the procedure of Example 1 above, diethylacetylchloride can be substituted for α-n-propyl-cyclopentane-acetylchloride to produce β-spiro[cyclohexane-1,2'-pyrrolidyl-1']-ethyl α'-diethylacetate, the hydrochloride and the methobromide salts. Likewise, dicyclohexyl-acetyl chloride and dicyclopentyl-acetyl chloride can be substituted in a similar manner to produce the corresponding α'-dicyclohexyl-acetate, and the α'-dicyclopentyl-acetate, respectively, and their corresponding hydrochloride and methobromide salts.

In the same manner, proceeding according to Example 1, but using instead β-spiro[4'-methylcyclohexane-1,2'-pyrrolidyl-1']-ethanol and dibutyl-acetyl chloride, β-spiro[4'-methylcyclohexane-1,2'-pyrrolidyl-1']-ethyl α'-dibutyl-acetate, the hydrochloride and the methobromide, respectively, can be produced. Likewise, substituting β-spiro[5'-methyl-cyclohexane-1,2'-pyrrolidyl-1']-ethanol and α,α-dipropyl-acetylchloride, one can produce β-spiro[5'-methyl-cyclohexane-1,2'-pyrrolidyl-1']-ethyl α'-dipropyl-acetate, the corresponding hydrochloride and methobromide.

By reacting the novel spiro[cycloalkane-1,2'-pyrrolidyl-1']-alkyl esters of disubstituted acetic acids of this invention, preferably in the form of the free base in an inert reaction medium with hydrogen peroxide, the amine oxides can be produced. Reacting these amine oxides with an acid in an inert reaction medium, e. g., hydrochloric, hydrobromic, hydriodic, sulfuric, phosphoric, acetic, propionic, benzoic, citric, succinic, lactic, nitric, or p-toluenesulfonic acid, is productive of the amine oxide-acid addition salts.

As stated above, the novel esters of this invention, as well as their hydrohalide or other acid addition salts such as salts with sulfuric, phosphoric, acetic, propionic, benzoic, citric, succinic, lactic, nitric, p-toluenesulfonic, and other acids exhibit pronounced uterine stimulation, for example, the hydrochloride salt of the compound of Example 2, i. e., β-spiro[cyclohexane-1,2'-pyrrolidyl-1']-ethyl α'-phenyl-Δ²-cyclopentene-acetate hydrochloride assayed by the method of Clary, Cameron, and Craver, Proc. Soc. Exptl. Biol. and Med. 77, 778 (1951). The novel salt produced pronounced uterine stimulation for five hours while showing poor anticholinergic activity in the Thiry-Vella loop dog.

The compounds of this invention have been found to exhibit good ganglionic activity without appreciable antichlorinergic action, when in the form of their quaternary ammonium salts; thus the methobromide salt of Example 2 is a good ganglionic blocking agent. It also has been found to be a moderately active coronary dilator.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound of the following structural formula:

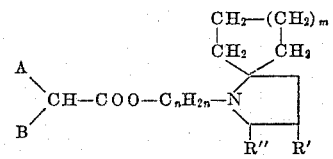

wherein A and B are hydrocarbon radicals of from one to twelve carbon atoms, inclusive, each of R' and R" is a member of the group consisting of hydrogen and methyl, m is a whole number from one to two, inclusive, n is a whole number from two to six, inclusive, and —$C_nH_{2n}$— is a lower-alkylene group containing at least two carbon atoms between the valences.

2. β-Spiro[cyclohexane-1,2'1pyrrolidyl-1']-ethyl α'-n-propyl-cyclopentane-acetate of the following formula:

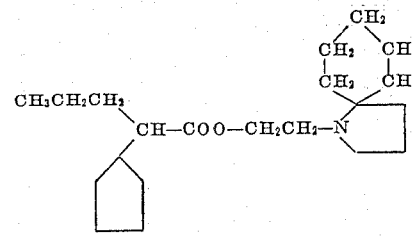

3. β-Spiro[cyclohexane-1,2'-pyrrolidyl-1']-ethyl α'-phenyl-Δ²-cyclopentene-acetate free base of the following formula:

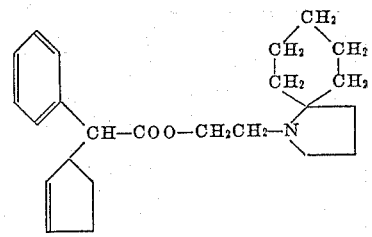

4. β-Spiro[cyclohexane-1,2'-pyrrolidyl-1']-ethyl α'-phenyl-cyclopentane-acetate of the following formula:

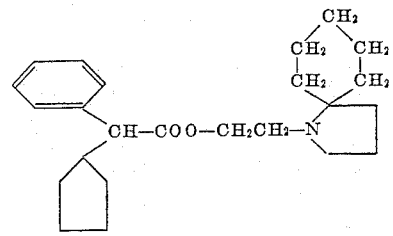

5. An acid addition salt of β-spiro[cyclohexane-1,2'-pyrrolidyl-1']-ethyl α'-phenyl-Δ²-cyclopentene-acetate.

6. β-Spiro[cyclohexane-1,2'-pyrrolidyl-1']-ethyl α'-phenyl-Δ²-cyclopentene-acetate hydrochloride.

7. β-Spiro[cyclohexane-1,2'-pyrrolidyl-1']-ethyl α'-phenyl-Δ²-cyclopentene-acetate methobromide.

8. The method of producing novel spiro[cycloalkane-1,2'-pyrrolidyl-1']-alkyl esters of disubstituted acetic acid comprising esterifying a 2-spiropyrrolidylalkanol of the formula:

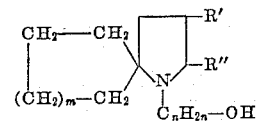

wherein R' and R" are each a member of the group consisting of hydrogen and methyl, m is a whole number from one to two, inclusive, n is a whole number from two to six, inclusive, and —$C_nH_{2n}$— is a lower alkylene radical having at least two carbon atoms between the valences with a disubstituted acetic acid halide of the formula:

wherein A and B are hydrocarbon radicals of from one to twelve carbon atoms, inclusive, and X is a member of the group consisting of chlorine and bromine.

References Cited in the file of this patent

UNITED STATES PATENTS

Re. 23,398    Cusic et al. _____ Aug. 14, 1951